Figure 1:
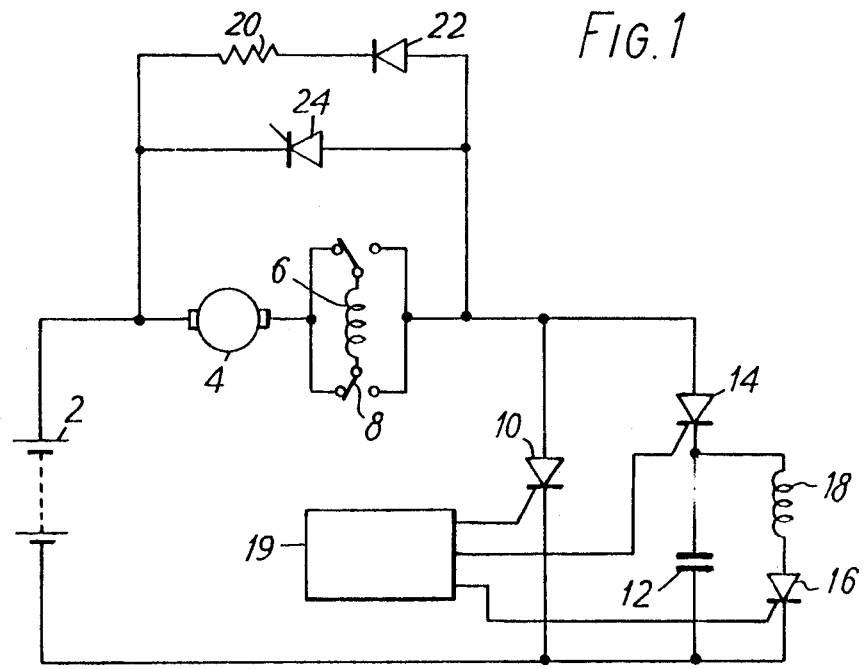

United States Patent [19]

Gurwicz et al.

[11] 4,104,571
[45] Aug. 1, 1978

[54] PULSE CONTROLLERS

[75] Inventors: David Gurwicz; Albert Everett Sloan, both of Gateshead, England

[73] Assignee: Sevcon Limited, Gateshead, England

[21] Appl. No.: 742,227

[22] Filed: Nov. 16, 1976

[30] Foreign Application Priority Data

Nov. 18, 1975 [GB] United Kingdom ............... 47483/75

[51] Int. Cl.² .............................................. H02P 3/12
[52] U.S. Cl. .................................. 318/380; 318/375; 318/373
[58] Field of Search ............... 318/373, 374, 375, 370, 318/380, 381, 210, 60, 379

[56] References Cited

U.S. PATENT DOCUMENTS 3,188,547 6/1965 Zelina .................................. 318/380

FOREIGN PATENT DOCUMENTS 1,242,130 8/1971 United Kingdom ...................... 318/373
1,131,422 10/1968 United Kingdom ...................... 318/380

Primary Examiner—Robert K. Schaefer
Assistant Examiner—Michael K. Mutter
Attorney, Agent, or Firm—Wolf, Greenfield & Sacks

[57] ABSTRACT

A pulse controller for a reversible d.c. series motor is provided, in place of the conventional freewheel diode across the armature and field and plugging diode across the armature, with a unidirectional current path connected across the armature and field and containing sufficient impedance to prevent build-up of motor current in interpulse periods when the motor is in a plugging mode, and switch means for shorting out the impedance during normal motoring.

16 Claims, 7 Drawing Figures

PULSE CONTROLLERS

This invention relates to pulse controllers.

More particularly, the invention relates to pulse controllers for controlling the supply of current to reversible d.c. series motors, of the kind comprising semiconductor switching means for connection in series between the motor and a d.c. supply and operable respectively to connect the motor to and disconnect the motor from the d.c. supply, the relative lengths of the periods during which the motor is connected to the supply and the periods during which the motor is disconnected from the supply being variable thereby to vary the mean voltage applied to the motor.

With such a controller, it is necessary to provide a unidirectional current path across the motor armature and field windings through which the motor current can circulate during interpulse periods, i.e. periods during which the semiconductor switching means disconnects the motor from the supply. Such a path has hitherto usually been provided by a freewheel diode connected across the motor.

When the motor is in a plugging mode, i.e. when the armature is rotating in a direction contrary to that corresponding to the condition of the reversal contactors, so that the e.m.f. generated by the armature is in the same direction as the applied e.m.f. due to the d.c. supply, the armature generated e.m.f. tends to cause an increase in current in the freewheel diode loop, consisting of the armature, field windings and freewheel diode, during interpulse periods. The increase in field current causes an increase in the armature generated e.m.f. and a consequent further increase in current in the freewheel diode loop. The current in that loop therefore increases rapidly, producing a very high braking torque. To prevent this, pulse controllers have hitherto included a plugging diode connected across the motor armature, the plugging diode becoming conductive during plugging and thereby limiting the armature generated e.m.f.

According to this invention there is provided a pulse controller for controlling the current supply to a reversible d.c. series motor, comprising semiconductor switching means for connection in series with the d.c. motor and a d.c. supply and adapted repetitively to connect the motor to and disconnect the motor from the d.c. supply, a unidirectional current path connected in use across the motor armature and field windings and containing impedance such that when the motor is in a plugging mode current in the loop including the armature, field windings and current path decays during interpulse periods when the motor is disconnected from the d.c. supply by the semiconductor switching means, a switch means arranged on actuation thereof to short out the impedance in the unidirectional current path, actuating means for actuating the switch means to short out the impedance during interpulse periods at least when the motor is not in the plugging mode, and means for controlling the mark-space ratio of the semiconductor switching means during plugging.

During plugging, the switch means are not actuated to short out the impedance so that, in the interpulse periods, motor current circulates through the unidirectional current path containing impedance. The impedance is such that, during the interpulse period, the armature generated e.m.f. is insufficient to cause increase of current in the loop containing the motor and unidirectional current path, so that the current decays during the interpulse period rather than building up rapidly as described above. The need for a plugging diode is therefore obviated. During normal motoring, when motor current can be allowed to go much higher than during plugging, the thyristor is fired into conduction to short out the impedance so that a low impedance freewheel path is provided for the motor current during interpulse periods.

Suitably, the impedance is provided by a resistor in the unidirectional current path.

The switch means for shorting out the impedance is preferably a thyristor, which may be connected directly across the impedance, or across the motor armature and field windings in parallel with the whole of the unidirectional current path.

Figure 6:
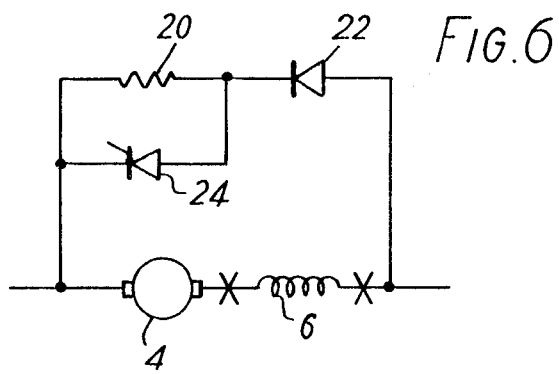
Figure 7:
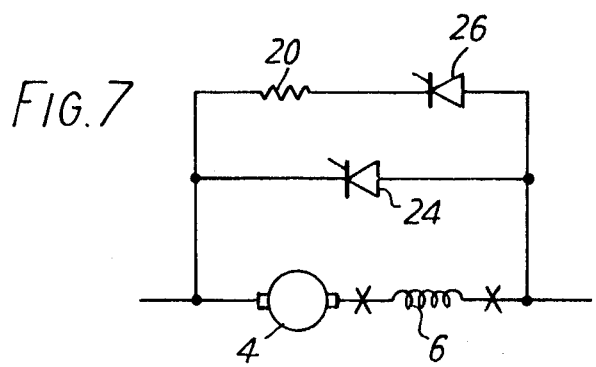
Figure 2:
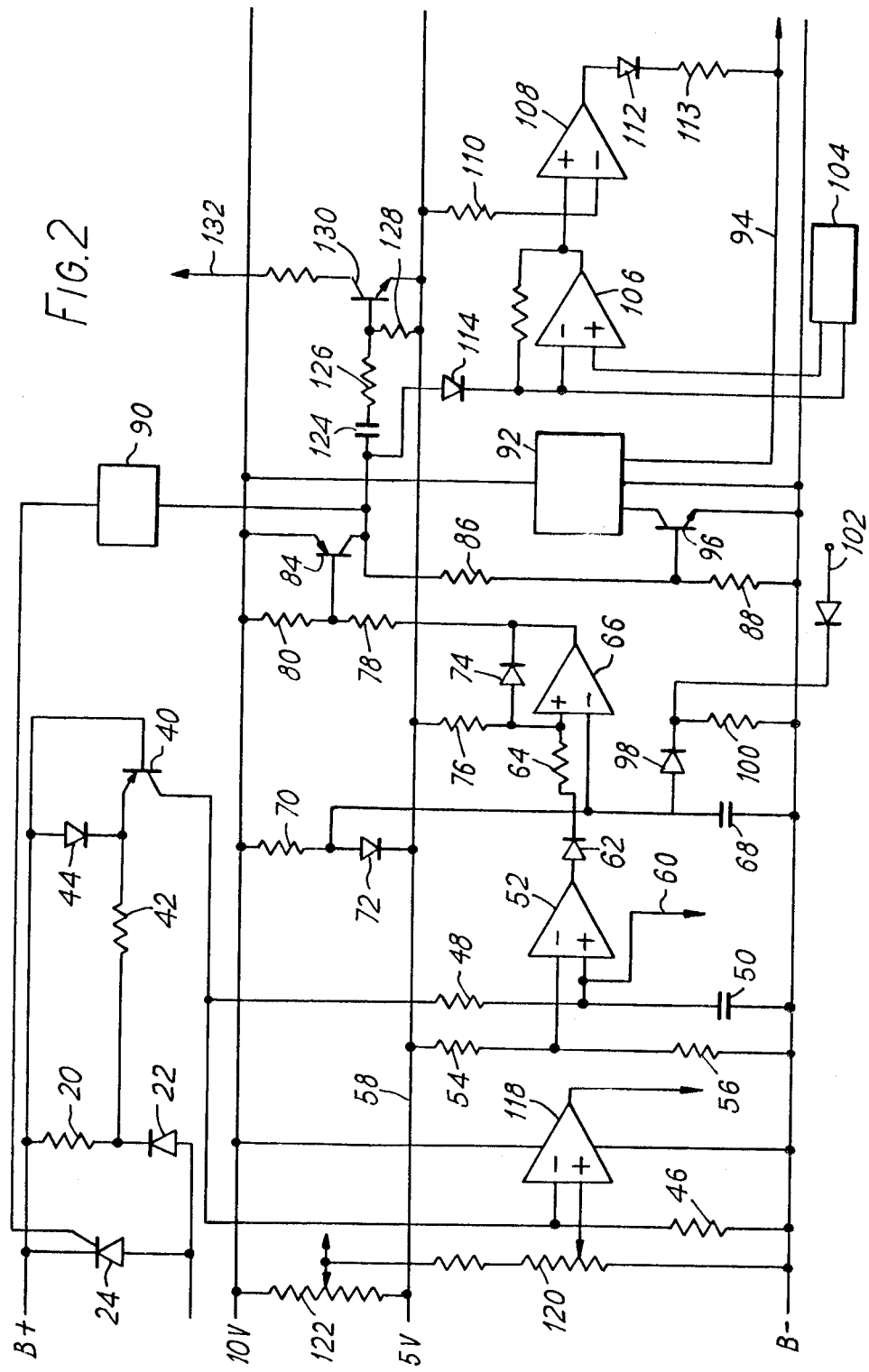

The invention will now be described, by way of example, with reference to the accompanying drawings, in which:

FIG. 1 is a circuit diagram of a pulse controller in accordance with the present invention, in circuit with a battery and a d.c. series motor, FIG. 2 is a diagram of part of the control circuitry of the pulse controller of FIG. 1, FIGS. 3, 4 and 5 are waveforms illustrating the variation of motor current with time in three conditions of operation of the motor and pulse controller of FIG. 1, FIG. 6 shows a modified form of the pulse controller according to the invention, and FIG. 7 shows a further modified form of pulse controller according to the invention.

Referring to FIG. 1, a pulse controller is employed to control the current supply from a battery 2 to a d.c. series motor having an armature 4 and field windings 6. The field windings 6 are provided with "forward" and "reverse" direction contactors 8. The pulse controller comprises a main thyristor 10 and a commutating circuit for the main thyristor consisting of a commutating capacitor 12 and a commutating thyristor 14 which is fired to connect the reverse charged commutating capacitor across the main thyristor 10 to commutate it and through which the commutating capacitor is then forward charged from the battery, and a charge reversal path for the commutating capacitor consisting of a further thyristor 16 and inductor 18 connected across the capacitor. Control circuitry 19 is provided for controlling firing of the thyristors 10, 14 and 16, including an "on" oscillator supplying firing signals to the main thyristor 10 and an "off" oscillator supplying firing signals to the commutating thyristor 14 to commutate the main thyristor. It will be apparent that various other well-known forms of commutation circuit could be employed in place of that shown in FIG. 1.

A unidirectional current path comprising a resistor 20 and diode 22 in series is connected across the motor armature 4 and field windings 8. A thyristor 24 is connected across the resistor 22 and thyristor 24 being connected together and to the anode of main thyristor 10.

In operation of the circuit of FIG. 1, during normal motoring, the motor current increases during "on" periods, i.e. when the main thyristor 10 is conducting, as current is supplied from the battery. During "off" or interpulse periods, i.e. when the main thyristor 10 is non-conducting, the motor current circulates, after a short period in which the commutating capacitor forward charges from the battery, through the resistor 20 and diode 22 or through thyristor 24 if that thyristor is fired into conduction. During plugging, the motor current increases during "on" periods, the rate of increase being greater than during normal motoring since the generated armature e.m.f. is in series with the battery voltage. During interpulse periods the motor current circulates through the resistor 20 and diode 22. Since the generated armature e.m.f. is in a direction to drive current through that circuit, the resistance of resistor 20 must be high enough to ensure that, for all possible motor speeds, the motor current decays in the interpulse periods. The cumulative build up of motor current during plugging and consequent very high braking torque is thus avoided.

Figure 3:
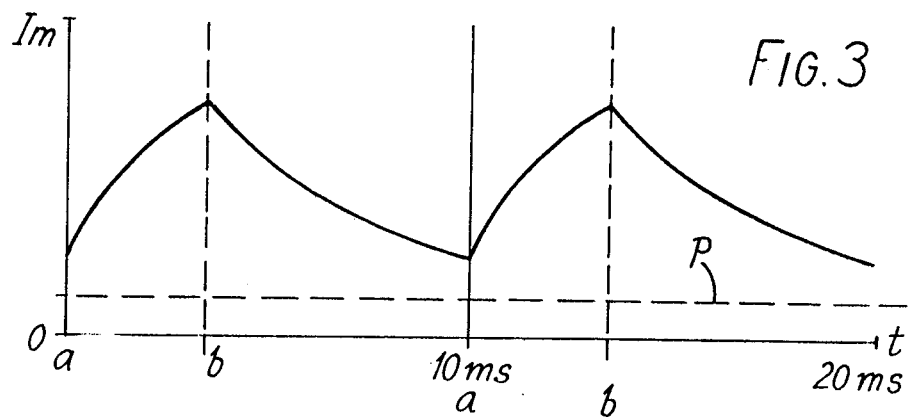
Figure 4:
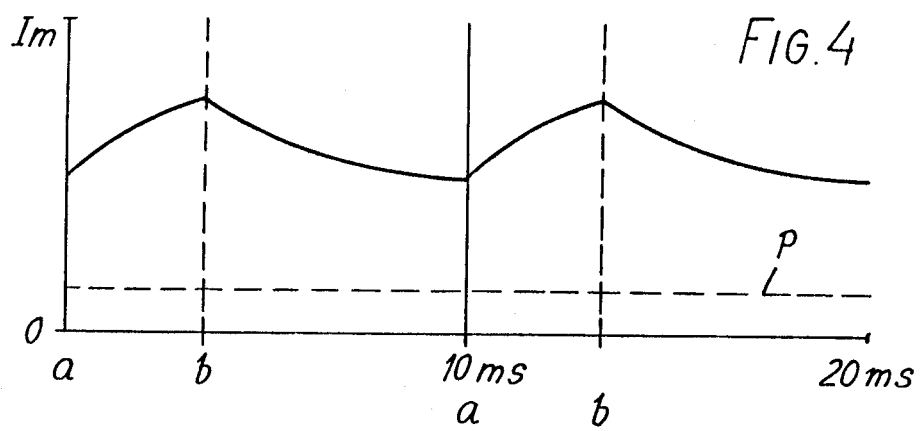

Thyristor 24 is fired in the interpulse periods during normal motoring, to short out resistor 20 and prevent the excessive decay of motor current and loss of energy. Since thyristor 24 must not be fired during plugging, circuitry must be provided to sense when the motor is in the plugging mode. To do this, use can be made of the fact that during plugging the motor current will decay relatively slowly and will not decay to zero in the interpulse periods, since the e.m.f. generated by the armature will cause sufficient current to flow through the field windings 6, diode 22 and resistor 20 to maintain the field flux at a level which makes the motor self-exciting. On the other hand, during normal motoring the motor current will delay exponentially during interpulse periods at a more rapid rate through diode 22 and resistor 20, if thyristor 24 is not fired, since the only source of energy maintaining the motor current in the self-inductance of the motor. This is illustrated in FIG. 3, which shows a typical waveform of motor current with the motor in the motoring mode and resistor 20 in circuit, and with a pulse width of about 3 milliseconds in a total repetition period (i.e. "on" periods plus "off" period) of 10 milliseconds, the main thyristor being fired at points $a$ and commutated at points $b$. FIG. 4 shows the waveform during plugging in similar conditions. The decay of current shown in interpulse periods in FIG. 4 is due to dissipation of the inductive energy stored in the motor and is at a rate dependent on a natural time constant of the motor. If the interpulse period were extended indefinitely, and the motor speed were maintained constant, the motor current would decay to a constant value equal to $$(V_G - V_{D22}/R_M + R_{20})$$

where $V_G$ is the armature generated e.m.f. (equal to the product of the motor speed, motor current and a motor constant), $V_{D22}$ is the voltage drop across diode 22, $R_M$ is the total motor resistance and $R_{20}$ the resistance of resistor 20.

Figure 5:
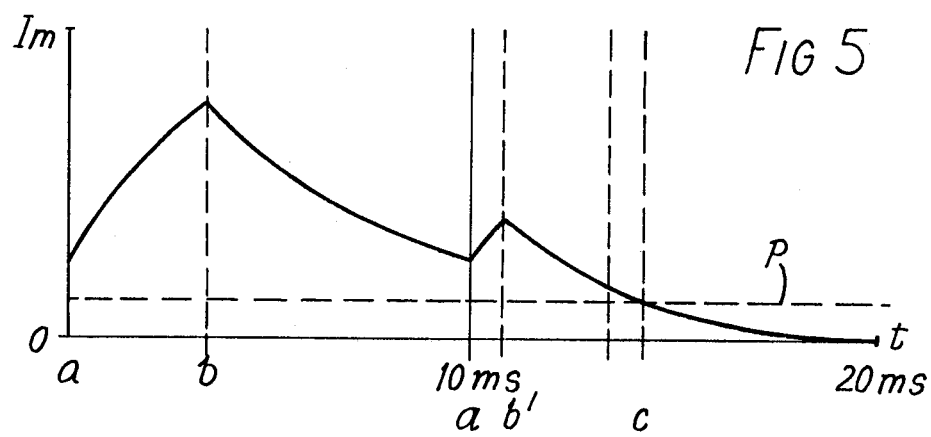

It is therefore possible to determine whether the motor is in a motoring mode by measuring the motor current during interpulse periods and determining whether it falls to a low value. However, there are circumstances in which the interpulse period may not be long enough to ensure that the motor current falls to a low level even when the motor is in a motoring mode. For example, towards the end of a plugging cycle, when the motor has been brought almost to a stop by plug braking, it is necessary to provide a relatively high mark-space ratio to maintain sufficient braking torque, e.g. on the "on" time in a 10 millisecond period may be as high as 4 or 5 milliseconds. Thus when plugging has ceased and the motor has begun to accelerate in the opposite direction, the motor current may not decay sufficiently in the interpulse periods to indicate that the plugging has ceased, and a signal to effect firing the thyristor 24 may therefore not be given until the mean motor current has fallen to a very low value. To avoid this problem a sampling technique may be used, in which the "on" period of the main thyristor is reduced at intervals of, say, 200 milliseconds, to a low value so that the length of the interpulse period is increased to a value which will allow the motor current to decay to a very low value if the motor is in the motoring mode, so that measurement of the motor current at the end of the period will determine whether the motor is in the motoring or the plugging mode. This is illustrated in FIG. 5, which shows the effect of terminating the "on" period at time $b'$. The line $p$ indicates the level of motor current at which a signal is provided indicating that the motor is in the motoring mode, the signal being parallel at time $c$ in FIG. 3.

A circuit employing the technique referred to, and including means for limiting the mean motor current during plugging, is shown in FIG. 2.

Referring to FIG. 2, the controller includes means for measuring current flow in the freewheel diode path, comprising a p-n-p transistor 40 the emitter of which is connected through a resistor 42 to the junction of freewheel diode 22 and resistor 20 and the base of which is connected to the other end of resistor 20, i.e. to battery positive. A diode 44 is connected between the base and emitter of transistor 40. The emitter current of transistor 40 is determined by the resistance of resistor 42 and the voltage appearing across resistor 20, which is of course proportional to the current in the freewheel diode path, so that the collector current of the transistor is proportional to that current. The collector current is measured by sensing the voltage across resistor 46 connected between the collector of transistor 40 and battery negative. The collector of transistor 40 is also connected to battery negative through a resistor 48 and capacitor 50, so that the voltage across resistor 46 appears across capacitor 50. The junction of resistor 48 and capacitor 50 is connected to the non-inverting input of an operational amplifier 52, which acts as a voltage comparator. The inverting input of amplifier 52 is connected to the junction of resistors 54 and 56 forming a potential divider connected between a stabilised five-volt rail 58 and battery negative. The potential at the input of the amplifier is relatively low, e.g. between 1 and 1.5 volts, so that the amplifier will respond to relatively low levels of current flow through the freewheel diode path. Whenever the current in the freewheel diode path exceeds a predetermined level, the output of operational amplifier 52 will go to logic 1, the output being then about ten volts. Since the collector current of transistor 40 falls to zero during each "on" period, i.e. when the main thyristor 10 is conducting, to maintain the logic 1 outout from amplifier 52 during "on" periods the voltage across the main thyristor 10 is inverted and a voltage dependent on that inverted voltage is supplied to the non-inverting input of the amplifier through line 60. Thus, during plugging, a constant output signal is provided by amplifier 52.

The output of operational amplifier 52 is connected through diode 62 and resistor 64 to the non-inverting input of a further operational amplifier 66. The non-inverting input of amplifier 66 is also connected through resistor 76 to the five-volt rail 58. The inverting input of amplifier 66 is connected to capacitor 68, which is normally charged from a stabilised ten-volt rail 82 through resistor 70 and held at a voltage of just over five volts by means of the diode 72 connecting it to the five-volt rail 58. Thus a high output, of about ten volts, from amplifier 52 causes the output of amplifier to go to logic 1, producing a positive output. If the output of amplifier 52 falls to zero (indicating that the motor is in its normal motoring mode) the output of amplifier 66 also falls to zero, the amplifier being latched in that condition by feedback through the diode 74. The output of amplifier 66 is connected through resistors 78 and 80 to a stablised ten-volt rail 82, the junction of resistors 78 and 80 being connected to the base of a p-n-p transistor 84. The emitter of transistor 84 is connected to the ten-volt rail 82 and its collector is connected to battery negative through resistors 86 and 88. The collector of transistor 84 is also connected to a gate driver circuit 90 which supplies a firing voltage to the gate of thyristor 24 when collector current flows in transistor 84. Thus when the output from operational amplifier 66 is zero, transistor 84 is turned fully on, and a firing voltage is supplied to the gate of thyristor 24. When the output of amplifier 66 is positive, indicating that the motor is in the plugging mode, transistor 84 is turned off, and gate driver circuit 90 is prevented from firing thyristor 24.

In order to provide the wide interpulse "sampling" periods during plugging, the circuit includes a free-running oscillator 92 arranged to produce a series of high positive outputs of about 15 milliseconds duration spaced at intervals of about 200 milliseconds. The output of the oscillator 92 is supplied through line 94 to the "off" oscillator controlling commutation of the main thyristor 10. The additional charge supplied to the "off" oscillator causes the main thyristor to be commutated very shortly after it has been fired, giving a short "on" time of the order of, say, 50 to 200 microseconds. During normal motoring, when transistor 84 is turned fully on, the collector current of the transistor turns on transistor 96, the base of which is connected to the junction of resistors 86 and 88. The turning on of transistor 96 clamps part of the oscillator 92 to battery negative to inhibit the oscillation and prevent interference with the "off" oscillator during normal motoring.

During start-up of the motor, when the "forward" or "reverse" direction contactors 8 are first closed, the motor current will initially be low so that the motor will appear to the control circuits to be in the normal motoring mode even if it is in the plugging mode, e.g. if a load on the motor is rotating the armature in the direction opposite to that corresponding to the condition of the direction contactors. It is therefore necessary to inhibit firing of the thyristor 24 during the first few pulses of the pulse controller to allow the motor current to build up. This is effected by means of a diode 98 and resistor 100 connected across the capacitor 68 in the input circuit of operational amplifier 66. When neither direction contactor is closed, capacitor 68 discharges through diode 98 and resistor 100, so that the potential at the inverting input of amplifier 66 is lowered and the output of the amplifier maintained at logic 1 even when the output of amplifier 52 is zero, the non-inverting input of amplifier 66 being then held at five volts by resistor 76. The firing of thyristor 24 is therefore inhibited until capacitor 68 has charged through resistor 70 to just above the five-volt level. Charging of the capacitor 68 begins when its discharge through diode 98 and resistor 100 is inhibited by a positive voltage supplied through line 102 from a direction selector switch which effects closure of the direction contactors. As long as the direction contactors remain closed, the signal on line 102 reverse biases diode 98 and prevents discharge of capacitor 68.

The removal of the signal from line 102 when the direction contactors are opened also acts to unlatch amplifier 66, if it has been previously latched in the condition giving zero output. Thus when the normal motoring mode is sensed, a firing signal will be supplied, through transistor 84, to thyristor 24 and will be maintained until the direction contactors are opened.

In order to limit the mark-space ratio of the pulse controller during plugging, the circuit includes means for limiting the peak motor current in each "on" period of the main thyristor 10 during plugging and means for delaying the next "on" pulse until the motor current has decayed to a predetermined value. The means for limiting the peak motor current comprises a current shunt 104, connected in one of the leads to the battery, the output of the shunt being amplified by an operational amplifier 106 and applied to the non-inverting input of a further operational amplifier 108. The inverting input of amplifier 108 is connected through resistor 110 to the five-volt rail 58, so that the output of the amplifier goes from zero to logic 1 when the output of the current shunt 104 exceeds a predetermined value. The output of amplifier 108 is supplied through diode 112 and resistor 113 to line 94 connected to the "off" oscillator, and rapidly charges the "off" oscillator to cause it to fire the commutating thyristor 14. The main thyristor 10 is thus commutated to terminate the "on" period when the motor current rises to a predetermined value. The peak current limiting means is inhibited during normal motoring by a voltage from the collector of transistor 84 supplied through diode 114 to the inverting input of amplifier 106 which latches the amplifier in a logic zero output condition and prevents amplifier 108 supplying current to the "off" oscillator.

To delay the next "on" pulse until the motor current has decayed to a predetermined value, the voltage across resistor 46 in the collector circuit of transistor 40 is supplied to the inverting input of an operational amplifier 118. The non-inverting input of amplifier 118 is connected to the slider of potentiometer 120 by means of which the voltage at that input is preset. When the collector current of transistor 40, which is proportional to the motor current during plugging, exceeds a predetermined value, the output of amplifier 118 goes from logic 1 to logic zero. The output of the amplifier is connected to the "on" oscillator in such a manner that the oscillator is inhibited, preventing the supply of an "on" pulse, when the output is at logic zero. Thus if the motor current in an interpulse period during plugging exceeds the predetermined value, the next "on" pulse is delayed until the current has decayed to that value, so that the mark-space ratio of the controller is decreased.

It will be appreciated that the limitation of the peak current and delay of the "on" pulses during plugging will control the mean motor current and therefore the braking torque applied to the motor, the braking torque being preset by means of potentiometer 120. A degree of control of braking may be given to the operator by connecting the potentiometer 120 as shown to the slider of a further potentiometer 122 connected between the five-volt and ten-volt rails. For example, where the motor is the traction motor of a battery operated vehicle, the slider of potentiometer 122 may be the slider of the usual speed potentiometer coupled to the accelerator pedal of the vehicle.

Where the pulse controller includes a delay circuit for limiting the rate of increase in mark-space ratio, for example as described in British patent specification No. 963,648, it is desirable to ensure that the delay circuit is reset to zero when the motor changes from the plugging to the motoring mode, to prevent a sudden change in mean motor current if thyristor 24 is fired to short out resistor 20 with the controller operating at a high mark-space ratio. To provide a signal for resetting the delay circuit, the collector of transistor 84 is connected through a differentiating circuit comprising capacitor 124 and resistors 126 and 128 to the base of an n-p-n transistor 130, the emitter of which is connected to the five-volt rail and the collector of which is connected through line 132 to the delay circuit. Thus when transistor 84 is switched on, transistor 130 is switched on momentarily to supply a signal to the delay circuit.

It will be apparent from the above description that, in operation of the circuit of FIG. 2, the circuit will sense on closure of the direction contactors whether the motor is in the plugging mode or the motoring mode. It it is in the plugging mode, the gate circuit 90 will be inhibited from firing thyristor 24, and the mean motor current and hence the braking torque will be limited. When the motor goes into the motoring mode, transistor 84 will be switched on and will remain on until the direction contactors are again opened. A continuous voltage will therefore be applied to the gate of thyristor 24, which will thus be rendered conducting when it is forward biased by the voltage across the motor during interpulse periods. If an attempt is made to reverse the direction of the motor withoug changing over the direction contactors when the motor is in the motoring mode, e.g. if a vehicle driven by the motor is ascending a slope and the driver does not keep the accelerator pedal sufficiently depressed, so that the vehicle tends to run backwards down the slope, the firing signal to thyristor 24 will be maintained. A very high braking torque will therefore be produced by current flow through thyristor 24, which will prevent the vehicle from running away down the hill. The control system thus provides automatic prevention of "roll-back" of the vehicle.

FIG. 6 shows a modification of the pulse controller in which the thyristor 24 is connected directly across resistor 20 rather than across both resistor 20 and diode 22.

FIG. 7 shows a further modification of the pulse controller in which the diode 22 is replaced by a thyristor 26 in series with the resistor 20, the thyristor 26 being fired in the interpulse periods during plugging.

It will be appreciated that various other forms of control circuitry could be provided to inhibit firing of the thyristor 24 and to control the motor current during plugging. For example, control circuitry could be arranged to inhibit firing of the thyristor during the first few pulses of the pulse control after the direction contactors have been closed to connect the motor in series with the supply and the controller. During this time the direction of the voltage across the armature will indicate whether the motor is in the plugging mode or motoring mode. The voltage could therefore be sensed by suitable circuitry and inhibition of firing of the thyristor maintained if the direction of the voltage indicates that the motor is in the plugging mode.

Alternatively, the thyristor shorting out the impedance could be fired only when the motor current flowing in interpulse periods exceeded a predetermined value less than the maximum current which can occur during plugging. The thyristor would then not be fired during normal motoring when the current was below the predetermined level, but at such relatively low currents the impedance in the unidirectional current path would not damagingly affect its operation as a free-wheel path for the motor current. The thyristor could be fired for example when the voltage across the resistor 20 exceeded a value corresponding to the predetermined level of current.

Other modifications could be made in the described embodiment. For example, the size of the impedance in the unidirectional path across the armature and field windings could be chosen to give a desired minimum braking torque during plugging with the main thyristor remaining non-conducting, so that no current is supplied from the battery. The braking torque can then be increased from the minimum by pulsing the thyristor.

Instead of applying a firing signal to the thyristor 24 during normal motoring so that the thyristor is rendered conducting when it is forward biased by the voltage across the motor, the firing of the thyristor could be delayed during interpulse periods to allow part of the stored energy in the motor to be transferred to the commutating capacitor to increase its forward charge. The thyristor could, for example, be fired when the commutating capacitor forward voltage reached a predetermined level, using circuitry such as that described in British patent specification No. 1,272,401. The forward charge on the commutating capacitor could be further increased by employing a thyristor 26 in place of the diode 22, as in the embodiment of FIG. 7, the thyristor 26 being fired simultaneously with thyristor 24 during normal motoring. During plugging the thyristor 26 could be fired in response to the forward voltage on the commutating capacitor.

The thyristor for shorting out the impedance in the unidirectional current path could be replaced by other forms of switch, such as a power transistor or an electromechanical switch provided with control means for closing the switch during plugging and opening the switch during normal motoring.

A pulse controller according to the invention has the following advantages over pulse controllers employing a plugging diode across the armature;

(a) The armature current and field current are always equal, both during normal motoring and during plugging. The braking torque during plugging can therefore be precisely controlled by controlling the motor current. The torque could, for example, be kept constant or varied in any desired manner in response to some other parameter such as motor speed.

(b) Since the armature and field currents are equal, maximum braking torque during plugging can be acheived without excessive armature current.

(c) Most of the stored energy which must be dissipated during plugging is dissipated in the impedance in the unidirectional current path rather than in the motor armature.

(d) When the invention is applied to a thyristor pulse controller for the traction motor of a battery driven vehicle, in which it is usual to connect the armature, field windings and main thyristor in that order between the positive and negative terminals of the battery, the anodes of the main thyristor, of the thyristor for shorting out the impedance, and of the diode or thyristor in series with the impedance can be connected to a common point, so that the three components can be mounted on a common heat sink.

We claim:

1. A pulse controller for controlling the current supply to a reversible d.c. series motor, comprising semiconductor switching means for connection in series with the d.c. motor and a d.c. supply and adapted repetitively to connect the motor to and disconnect the motor from the d.c. supply, a unidirectional current path connected in use across the motor armature and field windings so that motor current can circulate in the loop including the armature, field windings and current path during interpulse periods when the motor is disconnected from the d.c. supply by the semiconductor switching means, the unidirectional current path containing impedance such that when the motor is in the plugging mode the current circulating through the said loop decays during the said interpulse periods, a switch means arranged on actuation thereof to short out the impedance in the unidirectional current path, actuating means for actuating the switch means to short out the impedance during interpulse periods at least when the motor is not in the plugging mode, and means for controlling the mark-space ratio of the semiconductor switching means during plugging.

2. A pulse controller as claimed in claim 1, in which the impedance is provided by a resistor in the unidirectional current path.

3. A pulse controller as claimed in claim 1 or, in which there are provided means for determining whether the motor is in the plugging mode or motoring mode and operable when the motor is in the plugging mode to inhibit actuation of the switch means for shorting out the impedance.

4. A pulse controller as claimed in claim 3, in which the means for determining whether the motor is in the plugging mode or motoring mode comprises sensing means for motoring measuring current flow through the unidirectional path across the armature and field windings during an interpulse period.

5. A pulse controller as claimed in claim 4, in which the impedance in the unidirectional current path is a resistor, and the sensing means comprises means for sensing the voltage across the resistor during interpulse periods.

6. A pulse controller as claimed in claim 4, in which the means for determining whether the motor is in the plugging mode or motoring mode includes circuitry adapted to provide at regular intervals, each of length equal to a multiplicity of repetition periods of the semiconductor switching circuit, a signal causing the next interpulse period to be increased to length sufficient to ensure that the current in the said unidirectional path falls below the predetermined value in the lengthened interpulse period of the motor is in the motoring mode.

7. A pulse controller as claimed in claim 1, in which the actuating means is adapted, after actuation of the switch means, to maintain the switch means in a condition to short out the said impedance until direction contactors of the motor have been opened to disconnect the motor from the supply.

8. A pulse controller as claimed in claim 1, in which the means for controlling the mark-space ratio of the semiconductor switching means during plugging comprises means for limiting the mark-space ratio of the semiconductor switching means during plugging.

9. A pulse controller as claimed in claim 8, in which means for limiting the mark-space ratio of the semiconductor switching means during plugging comprises means for sensing the current flowing in the said unidirectional current path during each interpulse period, and means for delaying the start of the next "on" pulse of the semiconductor switching means if the current exceeds a preset value until the current has decayed to the preset value.

10. A pulse controller as claimed in claim 9, in which the preset value of current is adjustable thereby to vary the braking torque.

11. A pulse controller as claimed in claim 8, in which the means for limiting the mark-space ratio of the semiconductor switching means during plugging comprises means for sensing the motor current during each "on" period of the semiconductor switching means and means for advancing the termination of the "on" pulse if the current exceeds a predetermined value.

12. A pulse controller as claimed in claim 6, in which there are provided means for inhibiting acutation of the switch means for shorting out the impedance in the unidirectional current path during a predetermined delay period from the initial closing of contactors connecting the motor in series with the d.c. supply and the semiconductor switching means.

13. A pulse controller as claimed in claim 1, in which the switch means for shorting out the impedance in the unidirectional current path comprises a thyristor, and the actuating means comprises firing circuit means for applying a firing signal to the thyristor during interpulse periods at least when the motor is not in the plugging mode.

14. A pulse controller as claimed in claim 13, in which the thyristor for shorting out the impedance is connected directly across the impedance.

15. A pulse controller as claimed in claim 13, in which the thyristor for shorting out the impedance is connected across the motor armature and field windings, in parallel with the whole of the unidirectional current path.

16. A pulse controller as claimed in claim 1, in which the semiconductor switching means comprises a thyristor chopper circuit.

* * * * *